Dec. 1, 1953 M. KUHM 2,661,256
LIGHT METAL PISTON FOR COMBUSTION ENGINES
Filed May 2, 1950

INVENTOR
Max Kuhm
BY Bailey, Stephens & Huettig
ATTORNEYS

UNITED STATES PATENT OFFICE 2,661,256

LIGHT METAL PISTON FOR COMBUSTION ENGINES

Max Kuhm, Neckarsulm, Wurttemberg, Germany, assignor to Karl Schmidt Gesellschaft mit Beschraenkter Haftung, Neckarsulm, Wurttemberg, Germany, a corporation of Germany Application May 2, 1950, Serial No. 159,579

3 Claims. (Cl. 309—13)

This invention relates to a light metal piston for combustion engines, the elastic skirt of the piston having an ovally shaped cross section. While in operation, the head of the piston and the piston ring section reach a higher temperature and, consequently, a greater expansion than the skirt of the piston. The piston pin bosses also take part in the outward expansion of the head section with the result that the skirt also increases by expansion and will be forced to assume a more or less circular shape. When separated from the ring section by one or more horizontal slots, the piston skirt tends to expand and to assume a different shape without any special strain. Both the skirt and the head of the piston are firmly connected, i. e. the piston pin bosses are directly attached to the head of the piston by means of reinforcing ribs.

The oval shape of the piston must be designed so as to allow a noiseless operation of the piston while cold and to avoid seizure in the cylinder during thermal expansion. To carry out this task various types of pistons were designed. Most of the designers tried to give the piston constructional features that provided a control of abnormal heat expansion in different parts of the piston structure.

Another way to reach this aim is to use control or guide members such as rings, bars, strips and other inlay-parts consisting of a material with a smaller coefficient of expansion than that of the piston material. It has already been recommended by technical writers to avoid excessive expansion of the oval skirt by using connecting trusses parallel to the piston pins. In this way a permanent distortion of the skirt can be prevented, in other words, the oval shape restores itself while the piston is cooling off and the normal running clearance of the piston is maintained.

The object of this invention is to utilize the greater thermal expansion of the piston head and of the piston pin bosses, occurring in the direction of the pins when the piston is in operation, for controlling the upper section of the piston skirt.

Modern piston construction aims at reducing thermal expansion of the thrust faces. The piston is then allowed to expand to a greater extent in the direction of the piston pin bosses. However, by means of connecting struts, as mentioned above, such an expansion cannot be effected. On the contrary, thermal expansion is forced into an undesired direction.

Further, it is known that, with the aid of straight or ring-shaped supporting members, thermal expansion of the piston skirt can be made to increase beyond its natural growth, in the direction of the piston pin bosses. However, this construction also included the risk of throwing the skirt permanently out of shape.

It may also be stated that, in order to control the behaviour and the effect of expansion, the bi-metal effect of the piston material and of a metal with a smaller coefficient of expansion has been utilized. This is done by inserting, within the wall of a slotted piston or by arranging along the inner piston wall, a slotted ring, or several ring parts or similar members. The pistons used in such cases have a round shape, with the walls of the thrust faces of varying thicknesses, or a shape with an oval cross section. In both cases the pistons are vertically slotted. In the latter case the cross sections of the major and minor thrust faces and the walls in the direction of the piston pin bosses are also of varying thicknesses. When using controlling members of a different metal it has been recommended to anchor those parts with the aid of lateral projections which can be inserted in the piston wall. Under the influence of heat the inserted metal part is bent and thus the shape of the piston skirt is changed in such a way that the skirt walls of the major and minor thrust faces are retracted with the result that an outward expansion of the skirt in the direction of the piston pin bosses takes place.

Nevertheless, the application of the bi-metal effect has not always been satisfactory, since the changing of the shape of the skirt wall caused thereby can hardly be calculated or controlled. In fact, many tests are generally necessary to find out what changes actually take place while the piston is in operation.

To avoid such complicated preparatory work and to obtain thermal changes within the skirt wall that can easily be surveyed, the bi-metal effect is purposely left out of play. Instead, the invention provides for a completely closed, circular metallic guide disk, preferably in the shape of one or of several rings, whose metallic material possesses a smaller coefficient of expansion than the piston material. These rings are made preferably of iron or of a ferro-alloy. As a result of the influence of the heat during operation and the thermal expansion of the piston head and of the piston pin bosses in a radial direction, the circular ring assumes an oval shape, the greater ring diameter being parallel to the piston pin, and the lesser diameter being parallel to the thrust faces.

This ring has, preferably, a flat surface and therefore shows a larger capacity of resistance within the head section of the piston than a steel ring of circular cross section. Furthermore, the flat ring is placed in a position outside the piston material with which it is, nevertheless, firmly connected by means of projections protruding from the ring edge. The invention allows the piston to expand in a radial direction only, as the flat steel ring causes a retraction of the piston wall at the spots where the ring is inserted with the aid of the projections. Besides, as a result of the expansion of the piston in the direction of the piston pin the steel ring is pulled into an oval shape. The construction of the piston allows the piston metal to be retracted from the direction of the thrust faces with the result that there it contracts more than in the direction of the piston pin bosses.

In this way it is possible to control thermal expansion in the upper skirt section to such an extent that thermal expansion of the piston skirt perpendicular to the piston pin does not take place at all. Thermal expansion will then be forced wholly in the direction of the pin bosses.

To obtain best casting results it is recommended to arrange the flat ring from steel or from ferro-alloys in such a way that its inside part is separated from the piston body. The rings can then be placed into grooves provided in the core outside of the casting mold, where they are firmly held during the casting process.

Figure 1:
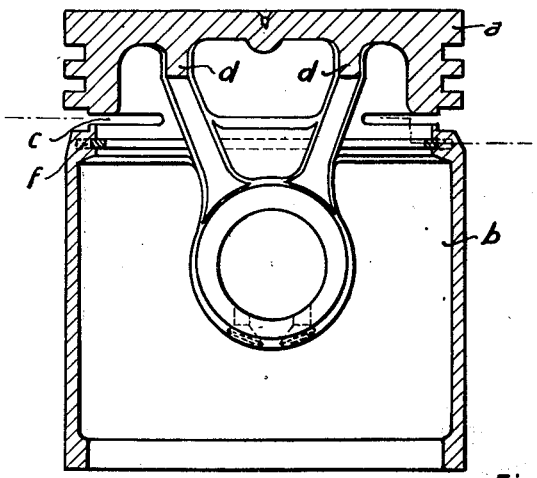
Figure 1 illustrates an axial section of a trunk piston.
Figure 2:
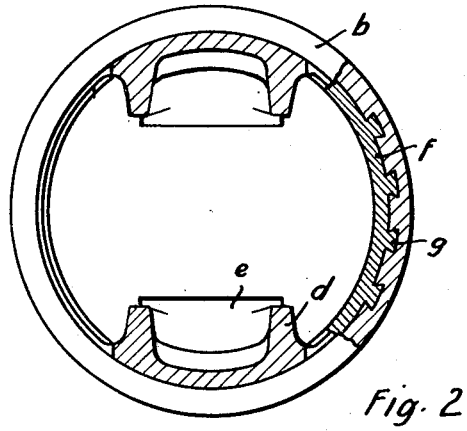
Figure 2 illustrates the inside of the piston, as viewed directly through the open end of the piston, with a cross section of the inserted ring.

The piston is composed of the head section *a* and the skirt *b*. The parts *a* and *b* are separated by horizontal slots *c*. They are held together by reinforcing ribs *d* of the head section. These ribs extend around the piston pin hole to the pin bosses *e*. In the upper skirt section a circular, closed flat sided ring *f* of iron or of any ferro-alloy is inserted, serving to control the expansion of the skirt while the piston is in operation. It is advisible to design the ring with lateral projections for anchoring the ring in the skirt wall.

What I claim is:

1. In a light metal piston having a head, an oval ground hollow unbroken skirt, ribs extending between said head and piston pin bosses in said skirt, slots between said head and skirt, and an expansion control member attached to said skirt, said control member comprising a solid circular ring at least partially embedded in and integral with said skirt adjacent said slots, said ring having a coefficient of expansion less than that of said skirt whereby said skirt when heated expands in the direction of the axis of said piston pin bosses to a more nearly circular shape.

2. In a piston as in claim 1, said ring further comprising projections integral with the outer circumference of said ring for anchoring said ring in said skirt.

3. In a piston as in claim 2, said ring further comprising a member having a flattened rectangular cross-section.

MAX KUHM.

References Cited in the file of this patent

UNITED STATES PATENTS

| Number | Name | Date |
| --- | --- | --- |
| 1,784,291 | Jardine | Dec. 9, 1930 |
| 2,024,958 | Wagner | Dec. 17, 1935 |
| 2,238,085 | Venner et al. | Apr. 15, 1941 |
| 2,240,967 | Venner et al. | May 6, 1941 |
| 2,240,968 | Venner et al. | May 6, 1941 |
| 2,262,132 | Berry | Nov. 11, 1941 |
| 2,465,767 | Venner et al. | Mar. 29, 1949 |
| 2,513,437 | Venner et al. | July 4, 1950 |

FOREIGN PATENTS

| Number | Country | Date |
| --- | --- | --- |
| 128,812 | Austria | June 25, 1932 |